US010489891B2

United States Patent
Schroers et al.

(10) Patent No.: US 10,489,891 B2
(45) Date of Patent: Nov. 26, 2019

(54) SAMPLE-BASED VIDEO SHARPENING

(71) Applicant: Disney Enterprises, Inc., Burbank, CA (US)

(72) Inventors: Christopher Schroers, Saarbrücken (DE); Henning Zimmer, Zurich (CH); Alexander Sorkine Hornung, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 133 days.

(21) Appl. No.: 15/630,865

(22) Filed: Jun. 22, 2017

(65) Prior Publication Data

US 2018/0260938 A1 Sep. 13, 2018

Related U.S. Application Data

(60) Provisional application No. 62/470,126, filed on Mar. 10, 2017.

(51) Int. Cl.
*G06T 5/00* (2006.01)
*H04N 5/213* (2006.01)
(Continued)

(52) U.S. Cl.
CPC .......... *G06T 5/002* (2013.01); *G06T 1/20* (2013.01); *G06T 5/003* (2013.01); *G06T 5/20* (2013.01);
(Continued)

(58) Field of Classification Search
CPC .......... G06T 5/003; G06T 2207/10016; G06T 5/002; G06T 2207/20182;
(Continued)

(56) References Cited

U.S. PATENT DOCUMENTS

2006/0257042 A1* 11/2006 Ofek .................. G06T 5/005
382/255
2010/0165206 A1 7/2010 Nestares
(Continued)

OTHER PUBLICATIONS

Cho, Sunghyun, Jue Wang, and Seungyong Lee. "Video deblurring for hand-held cameras using patch-based synthesis." ACM Transactions on Graphics (TOG) 31.4 (2012): 64. (Year: 2012).*
(Continued)

*Primary Examiner* — Wesley J Tucker
(74) *Attorney, Agent, or Firm* — Farjami & Farjami LLP (57) ABSTRACT

According to one implementation, a video processing system includes a computing platform having a hardware processor and a system memory storing a sample-based video sharpening software code. The sample-based video sharpening software code receives a video sequence, and classifies frames of the video sequence as sharp or unsharp. For each pixel of an unsharp frame, the sample-based video sharpening software code determines a mapping of the pixel to another pixel in some or all of the sharp frames, determines a reverse mapping of each of the other pixels to the pixel, identifies a first confidence value corresponding to each of the other pixels based on the mapping, identifies a second confidence value corresponding to each of the other pixels based on the mapping and the reverse mapping, and sharpens the pixel based on a weighted combination of the other pixels determined using the first and second confidence values.

20 Claims, 4 Drawing Sheets

(51) Int. Cl.
- *G06T 5/20* (2006.01)
- *G06T 1/20* (2006.01)
- *H04N 5/21* (2006.01)

(52) U.S. Cl.
CPC ............... *H04N 5/21* (2013.01); *H04N 5/213* (2013.01); *G06T 2207/10016* (2013.01); *G06T 2207/10024* (2013.01); *G06T 2207/20076* (2013.01); *G06T 2207/20172* (2013.01); *G06T 2207/20182* (2013.01)

(58) Field of Classification Search
CPC ... G06T 2207/20201; G06T 1/20; G06T 5/20; G06T 2207/10024; G06T 2207/20076; G06T 2207/20172; H04N 5/21; H04N 5/213
USPC .................................................. 382/254, 255
See application file for complete search history.

(56) References Cited

U.S. PATENT DOCUMENTS

| | | | |
|---|---|---|---|
| 2011/0211758 A1 | 9/2011 | Joshi | |
| 2011/0311115 A1* | 12/2011 | Li | G06T 7/37 382/128 |
| 2012/0121202 A1* | 5/2012 | Wang | G06T 5/003 382/255 |
| 2015/0262336 A1 | 9/2015 | Jin | |
| 2016/0006978 A1 | 1/2016 | Satoh | |
| 2016/0373717 A1 | 12/2016 | Wang | |
| 2017/0064204 A1* | 3/2017 | Sapiro | H04N 5/23267 |
| 2018/0122052 A1* | 5/2018 | Lebrun | G06T 7/207 |

OTHER PUBLICATIONS

Delbracio, Mauricio, and Guillermo Sapiro. "Hand-held video deblurring via efficient fourier aggregation." arXiv preprint arXiv:1509.05251 (2015). (Year: 2015).*

Kim, Tae Hyun, and Kyoung Mu Lee. "Generalized video deblurring for dynamic scenes." Computer Vision and Pattern Recognition (CVPR), 2015 IEEE Conference on. IEEE, 2015. (Year: 2015).*

Xiao, Jiangjian, et al. "Bilateral filtering-based optical flow estimation with occlusion detection." European conference on computer vision. Springer, Berlin, Heidelberg, 2006. (Year: 2006).*

Klose, Felix, et al., "Sampling Based Scene Space Video Processing." *ACM SIGGRAPH*, 2015. Los Angeles, California. pp. 1-11.

* cited by examiner

SAMPLE-BASED VIDEO SHARPENING

RELATED APPLICATIONS

The present application claims the benefit of and priority to Provisional Patent Application Ser. No. 62/470,126, filed Mar. 10, 2017, and titled "Sample-based Video Denoising and Sample-based Video Sharpening," which is hereby incorporated fully by reference into the present application.

BACKGROUND

Due to the popularity of video as an entertainment medium, ever more video content, including high definition (HD) and Ultra HD video content is being produced and made available to consumers. One fundamental challenge encountered in video processing is video sharpening, which is the de-blurring of video images. An important objective of video sharpening is to de-blur video images without destroying small scale features of those images.

One technique for video sharpening is performed in three-dimensional (3D) "scene space," in which video pixels are processed according to their 3D positions. Scene space based video sharpening relies on depth reconstruction, which limits that approach to static scenes with significant camera motion. However, in practice, most video sequences feature many dynamic moving objects, and often little or no camera motion, making depth reconstruction impossible.

SUMMARY

There are provided sample-based video sharpening systems and methods, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, due to the popularity of video as an entertainment medium, ever more video content, including high definition (HD) and Ultra HD video content is being produced and made available to consumers. One fundamental challenge encountered in video processing is video sharpening, which is the de-blurring of video images.

As further stated above, one technique for sharpening video is performed in three-dimensional (3D) "scene space," in which video pixels are processed according to their 3D positions. Scene space based video sharpening relies on depth reconstruction, which limits that approach to static scenes with significant camera motion. However, in practice, most video sequences feature many dynamic moving objects, and often little or no camera motion, making depth reconstruction impossible.

The present application discloses a sample-based video sharpening solution that overcomes the drawbacks and deficiencies in the conventional art. The present sample-based video sharpening solution is performed in two-dimensional (2D) "image-space," rather than 3D scene space, to determine a mapping of pixels in an unsharp frame of a video sequence to respective other pixels in frames of the video sequence classified as sharp. In addition, a reverse mapping of the other pixels to the pixel in the unsharp frame is determined. Confidence values corresponding respectively to the other pixels and to a correlation of the mapping and reverse mapping are identified and used to sharpen the pixels in the unsharp frame. By performing sharpening in 2D image-space, the present solution enables high quality, temporally coherent, sharpening of arbitrary video sequences including dynamic content and little or no camera motion, while advantageously preserving small scale features included in the video.

Figure 1:
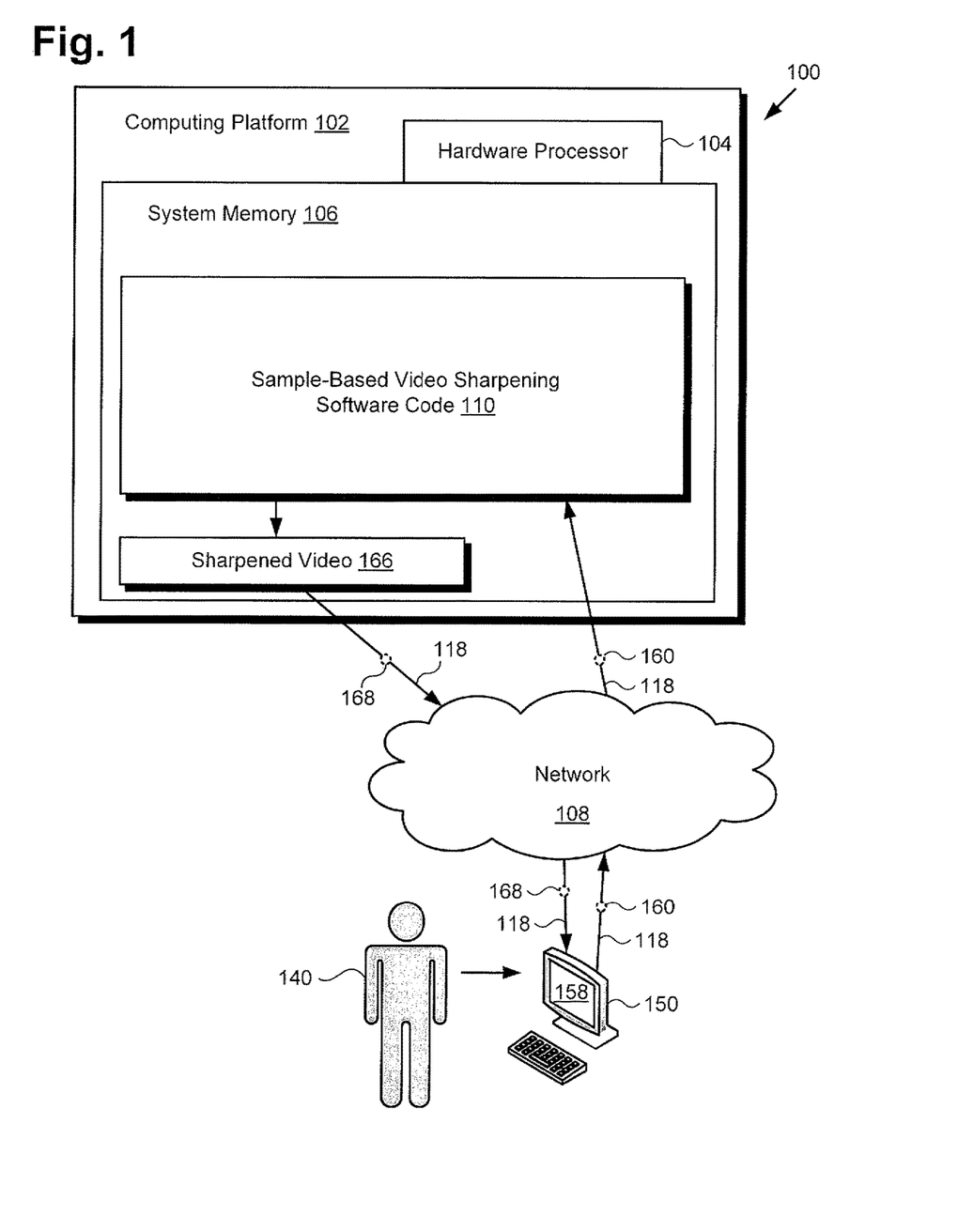
FIG. 1 shows a diagram of an exemplary video processing system for performing sample-based video sharpening, according to one implementation.

FIG. 1 shows a diagram of an exemplary video processing system for performing sample-based video sharpening, according to one implementation. As shown in FIG. 1, video processing system 100 includes computing platform 102 having hardware processor 104, and system memory 106 implemented as a non-transitory storage device. According to the present exemplary implementation, system memory 106 stores sample-based video sharpening software code 110.

As further shown in FIG. 1, video processing system 100 is implemented within a use environment including communication network 108, user device 150 including display 158, and user 140 utilizing user device 150. Also shown in FIG. 1 are network communication links 118 interactively connecting user device 150 and video processing system 100 via communication network 108, video sequence 160, and sharpened video 166 produced using sample-based video sharpening software code 110.

Figure 4:
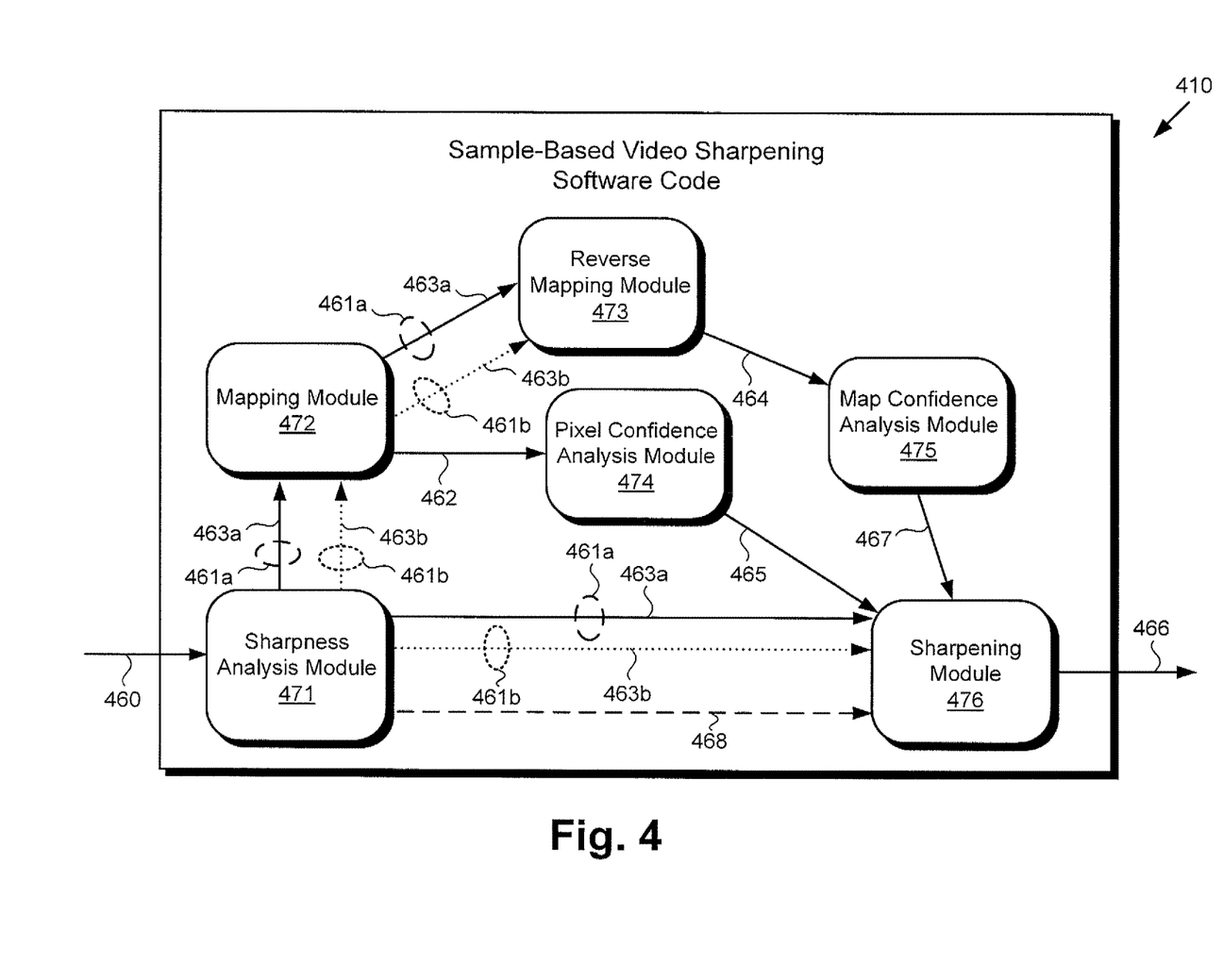
FIG. 4 shows an exemplary diagram of a sample-based video sharpening software code suitable for execution by a hardware processor of the systems shown by FIGS. 1 and 2, according to one implementation.

It is noted that although FIG. 1 depicts sample-based video sharpening software code 110 as being stored in its entirety in memory 106, that representation is merely provided as an aid to conceptual clarity. More generally, video processing system 100 may include one or more computing platforms 102, such as computer servers for example, which may be co-located, or may form an interactively linked but distributed system, such as a cloud based system, for instance.

As a result, hardware processor 104 and system memory 106 may correspond to distributed processor and memory resources within video processing system 100. Thus, it is to be understood that various portions of sample-based video sharpening software code 110, such as one or more of the features described below by reference to FIG. 4, may be stored and/or executed using the distributed memory and/or processor resources of video processing system 100.

According to the implementation shown by FIG. 1, user 140 may utilize user device 150 to interact with video processing system 100 over communication network 108. In one such implementation, video processing system 100 may correspond to one or more web servers, accessible over a packet-switched network such as the Internet, for example. Alternatively, video processing system 100 may correspond to one or more computer servers supporting a local area network (LAN), or included in another type of limited distribution network.

Although user device 150 is shown as a personal computer (PC) in FIG. 1, that representation is also provided merely as an example. In other implementations, user device 150 may be any other suitable mobile or stationary computing device or system. For example, in other implementations, user device 150 may take the form of a laptop computer, tablet computer, or smartphone, for example. User 140 may utilize user device 150 to interact with video processing system 100 to use sample-based video sharpening software code 110, executed by hardware processor 104, to produce sharpened video 166.

It is noted that, in various implementations, sharpened video 166, when produced using sample-based video sharpening software code 110, may be stored in system memory 106 and/or may be copied to non-volatile storage (not shown in FIG. 1). Alternatively, or in addition, as shown in FIG. 1, in some implementations, sharpened video 166 may be sent to user device 150 including display 158, for example by being transferred via network communication links 118 of communication network 108. It is further noted that display 158 may take the form of a liquid crystal display (LCD), a light-emitting diode (LED) display, an organic light-emitting diode (OLED) display, or another suitable display screen that performs a physical transformation of signals to light.

Figure 2:
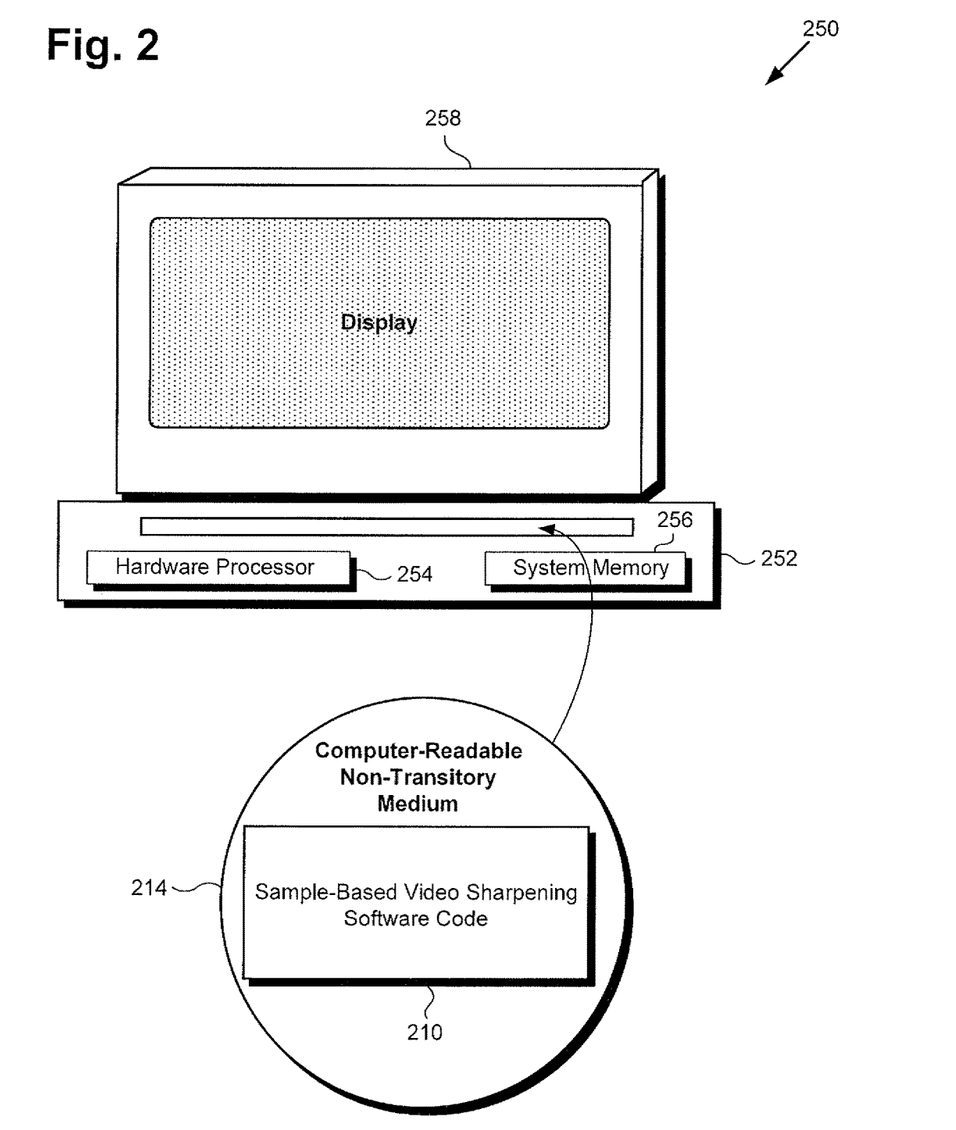
FIG. 2 shows an exemplary system and a computer-readable non-transitory medium including instructions for performing sample-based video sharpening, according to one implementation.

FIG. 2 shows exemplary system 250 and computer-readable non-transitory medium 214 including instructions for performing sample-based video sharpening, according to one implementation. System 250 includes computing platform 252 having hardware processor 254 and system memory 256, interactively linked to display 258. Display 258 may take the form of an LCD, LED display, an OLED display, or another suitable display screen that performs a physical transformation of signals to light. System 250 including computing platform 252 having hardware processor 254 and system memory 256 corresponds in general to video processing system 100 including computing platform 102 having hardware processor 104 and system memory 106, in FIG. 1. Consequently, system 250 may share any of the characteristics attributed to corresponding video processing system 100 by the present disclosure.

Also shown in FIG. 2 is computer-readable non-transitory medium 214 having sample-based video sharpening software code 210 stored thereon. The expression "computer-readable non-transitory medium," as used in the present application, refers to any medium, excluding a carrier wave or other transitory signal, is that provides instructions to hardware processor 254 of computing platform 252. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

According to the implementation shown in FIG. 2, computer-readable non-transitory medium 214 provides sample-based video sharpening software code 210 for execution by hardware processor 254 of computing platform 252. Sample-based video sharpening software code 210 corresponds in general to sample-based video sharpening software code 110, in FIG. 1, and is capable of performing all of the operations attributed to that corresponding feature by the present disclosure.

Figure 3:
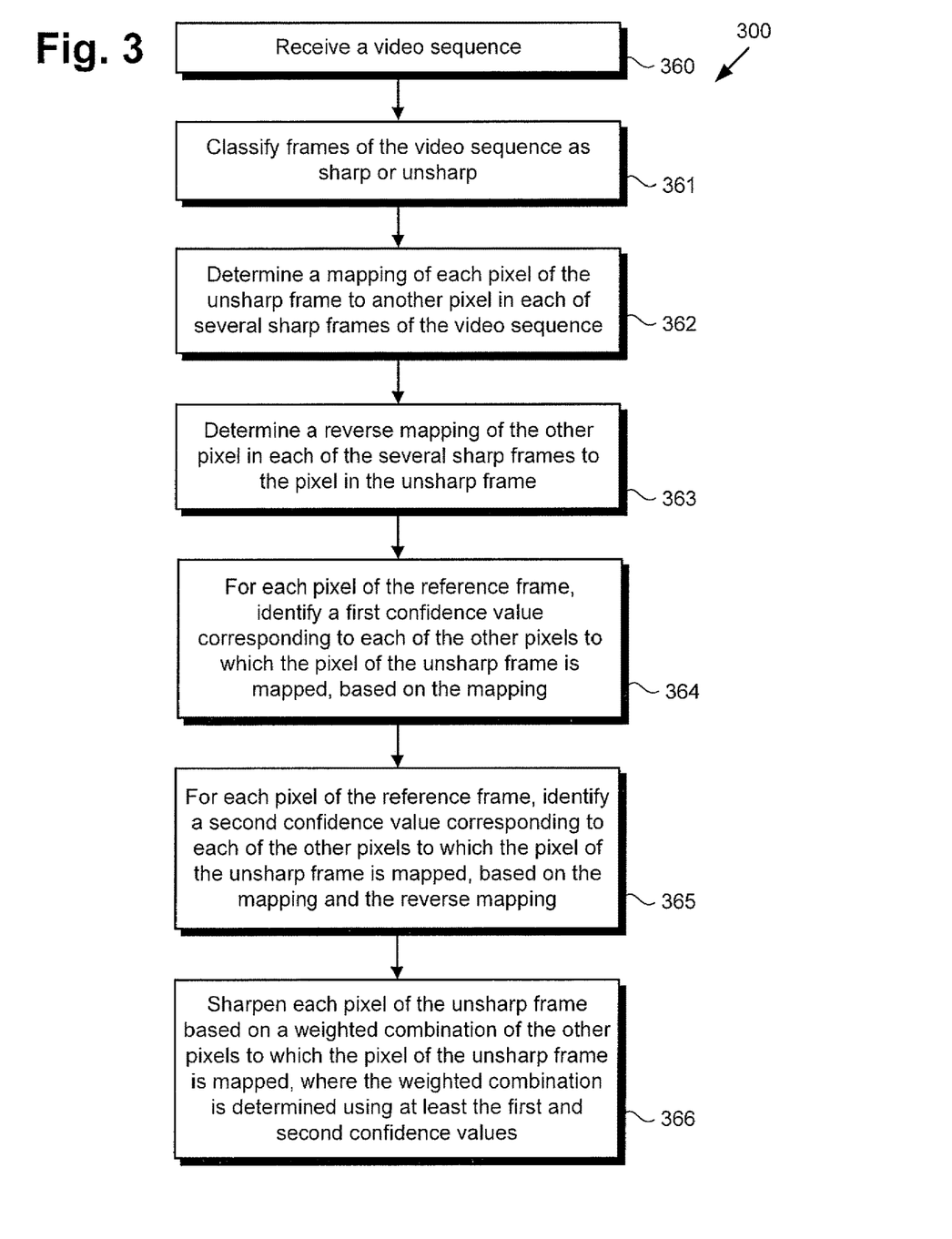
FIG. 3 shows a flowchart presenting an exemplary method for performing sample-based video sharpening, according to one implementation.

The functionality of sample-based video sharpening software code 110/210 will be further described by reference to FIG. 3 in combination with FIGS. 1, 2, and 4. FIG. 3 shows flowchart 300 presenting an exemplary method for use by a system, such as video processing system 100, in FIG. 1, or system 250, in FIG. 2, to perform sample-based video sharpening. With respect to the method outlined in FIG. 3, it is noted that certain details and features have been left out of flowchart 300 in order not to obscure the discussion of the inventive features in the present application.

FIG. 4 shows exemplary sample-based video sharpening software code 410 suitable for execution by hardware processor 104/254 of the respective systems shown by FIGS. 1 and 2, according to one implementation. As shown in FIG. 4, sample-based video sharpening software code 410 may include sharpness analysis module 471, mapping module 472, reverse mapping module 473, pixel confidence analysis module 474, map confidence analysis module 475, and sharpening module 476. Also shown in FIG. 4 are video sequence 460, sharp frames 461*a*, each including pixels represented by exemplary pixel 463*a*, unsharp frame or frames 461*b*, each including pixels represented by exemplary pixel 463*b*, mapping 462, reverse mapping 464, confidence values 465, confidence values 467, optional confidence values 468, and sharpened video 466.

Video sequence 460 and sharpened video 466 correspond respectively in general to video sequence 160 and sharpened video 166, in FIG. 1, and may share any of the characteristics attributed to those corresponding features by the present disclosure. In other words, like video sequence 460, video sequence 160 includes multiple frames that may be sharp frames 461*a* and one or more unsharp frame(s) 461*b*, each sharp and unsharp frame including multiple pixels corresponding respectively to pixels 463*a* and 463*b*.

Moreover, sample-based video sharpening software code 410 corresponds in general to sample-based video sharpening software code 110/210, in FIGS. 1 and 2, and those corresponding features may share the characteristics attributed to any corresponding feature by the present disclosure. That is to say, like sample-based video sharpening software code 410, sample-based video sharpening software code 110/210 may include modules corresponding to sharpness analysis module 471, mapping module 472, reverse mapping module 473, pixel confidence analysis module 474, map confidence analysis module 475, and sharpening module 476.

Referring now to FIG. 3 in combination with FIGS. 1, 2, and 4, flowchart 300 begins with receiving video sequence 160/460 (action 360). By way of example, user 140 may utilize user device 150 to interact with video processing system 100, or may interact directly with system 250, in order to produce sharpened video 166/466. As shown by FIG. 1, in one implementation, user 140 may do so by transmitting video sequence 160/460 from user device 150 to video processing system 100 via communication network 108 and network communication links 118. Alternatively, video sequence 160/460 may be received from a third party source of video content, or may be stored in system memory 106/256. Video sequence 160/460 may be received by sample-based video sharpening software code 110/210/410, executed by hardware processor 104/254.

Video sequence 160/460 includes multiple video frames, identifiable as corresponding to one or more shots. By way of definition, a "shot" refers to a sequence of frames within video sequence 160/460 that are captured from a unique camera perspective without significant camera movement, cuts, and/or other cinematic transitions. Thus, video sequence 160/460 may include a single shot having multiple frames, or may include multiple shots, with each shot having multiple frames. Furthermore, it is noted that a single frame of video sequence 160/460 may include multiple color images, some of which may be images of dynamic moving objects.

Flowchart 300 continues with classifying frames of video sequence 160/460 as sharp or unsharp (action 361). For example, the frames included in video sequence 160/460 may be classified as multiple sharp frames 461a and one or more unsharp frame(s) 461b. The classification of frames of video sequence 160/460 as sharp frames 461a and one or more unsharp frame(s) 461b may be performed by sample-based video sharpening software code 110/210/410, executed by hardware processor 104/254, and using sharpness analysis module 471.

Flowchart 300 continues with, for each pixel 463b of unsharp frame 461b, determining a mapping 462 of pixel 463b to another pixel 463a in each of some or all of sharp frames 461a (action 362). Determination of mapping 462 of pixel 463b to other pixel 463a in each of some or all of sharp frames 461a may be performed by sample-based video sharpening software code 110/210/410, executed by hardware processor 104/254, and using mapping module 472.

Mapping 462 may be performed using image space correspondences, for example, determined by means of optical flow. As a specific example, and expressing video sequence 160/460 as f(x, t) with spatial coordinates $x=(x, y)^T$ and time t, it is noted that color images, such as the images in frames 461a and 461b, commonly use three channels such that typically, f: $R^3 \to R^3$. It is further noted that, insofar as the variable t may describes temporal progression through the frames of video sequence 160/460, t may be used to represent frame progression and/or progression in time. Thus, the sequence $t_{-n}, \ldots t_n$ can refer concurrently to progression from an earlier time $t_{-n}$ to a later time $t_n$, or from an earlier frame $t_{-n}$ to a later frame $t_n$.

Characterizing unsharp frame 461b as $t_0$, an optical flow field E(u) from unsharp frame 461b to another, sharp frame 461a (t), can be expressed using Equation 1:

$$E(u) = \int_\Omega \Psi(\|f(x+u(x),t) - f(x,t_0)\|^2) + \Psi(\|\mathcal{J}u\|^2)dx$$

with a robust penalization function: $\Psi(s^2) = \sqrt{s^2+\varepsilon^2}$ and $\varepsilon=0.001$. Where $\mathcal{J}$ denotes the Jacobian, and $\|\cdot\|$ denotes the Euclidean norm, as known in the art. It is emphasized that, although Equation 1 is used as an exemplary expression for optical flow, other techniques for determining correspondences between pixel 463b of unsharp frame 461b ($t_0$) and other pixel 463a of sharp frame 461a (t) may be utilized.

The flow $u(x)=(u_1(x), u_2(x))^T$ is obtained by solving Equation 1 for u(x) and may be used to relate a location x in unsharp frame 461b ($t_0$) to the location x+u(x, t) in sharp frame 461a (t), i.e., a potential corresponding other pixel in another frame. Thus, according to the exemplary technique described above, pixel 463b of unsharp frame 461b is mapped to other pixels 463a in sharp frames 461a based on an optical flow field from unsharp frame 461b to the sharp frames 461a. Moreover, pixel 463b has a first location x in unsharp frame 461b, while other pixels 463a have respective second locations x+u(x, t) in sharp frames 461a.

Flowchart 300 continues with, for each pixel 463b of unsharp frame 461b, determining a reverse mapping 464 of other pixels 463a in sharp frames 461a to pixel 463b in unsharp frame 461b (action 363). Determination of reverse mapping 464 may be performed by sample-based video sharpening software code 110/210/410, executed by hardware processor 104/254, and using reverse mapping module 473.

Like mapping 462, reverse mapping 464 too may be performed using image space correspondences determined by means of optical flow, and in a manner analogous to that utilized in action 362. That is to say, the reverse flow $v(x)=(v_1(x), v_2(x))^T$ can by obtained by solving Equation 1, expressed as E(v) rather than E(u), for v(x) rather than u(x). Reverse mapping 464 may be used to relate a location x in sharp frame 461a (t) to the location x+v(x, t) in unsharp frame 461b ($t_0$). Thus, according to the exemplary technique described above, other pixels 463a of sharp frames 461a are mapped to pixel 463b in unsharp frame 461b based on an optical flow field from sharp frames 461a to unsharp frame 461b.

Flowchart 300 continues with, for each pixel 463b of unsharp frame 461b, identifying a first confidence value 465 corresponding to each of other pixels 463a to which pixel 463b is mapped by mapping 462, based on mapping 462 (action 364). Identification of first confidence value 465 may be performed by sample-based video sharpening software code 110/210/410, executed by hardware processor 104/254, and using pixel confidence analysis module 474.

Mapping 462, described above, can be a highly error prone process, such that not all other pixels 463a to which pixel 463b is mapped are actually useful for sharpening pixel 463b. In fact, if correspondences are determined from unsharp frame 461b to all other sharp frames 461a in video sequence 160/460, most of the determined correspondences will not be useful for sharpening pixel 463b. As a result, it is advantageous to identify confidence values corresponding to each of other pixels 463a in order to identify relevant other pixels 463a for use in sharpening pixel 463b.

For notational convenience, and to explicitly state which sharp frame 461a (t) the flow field a targets, a correspondence function g(x, t) is introduced as Equation 2:

$$g(x,t) = (x+u_1(x,y), y+u_2(x,y), t)^T$$

such that a sequence of corresponding points in frames $t_{-n}, \ldots t_n$ that match to the location x in unsharp frame 461b ($t_0$) can be addressed directly in video sequence 160/460 (f) by selecting the locations: $g(x, t_{-n}), \ldots, g(x, t_n)$.

In view of the foregoing, confidence value 465 corresponding to each of other pixels 463a to which pixel 463b is mapped, i.e., $w_c(x, t)$, can be expressed using Equation 3:

$$w_c(x, t) = \exp\left(\frac{-\|((G_\sigma * f)(x, t_0) - (G_\sigma * (f \circ g))(x, t))\|^2}{\sigma_c^2}\right)$$

where * denotes a spatial convolution, $G_\sigma$ is a Gaussian with standard deviation $\sigma$, and $\sigma_c$ is the standard deviation of the roughly Gaussian function $w_c(x, t)$.

According to Equation 3, above, confidence values 465 corresponding respectively to each of other pixels 463a is based on a color match between pixel 463b of unsharp frame 461b and each of other pixels 463a of sharp frames 461a. Furthermore, each confidence value 465 is proportional to the color match between pixel 463b of unsharp frame 461b and other pixel 463a of each sharp frame 461a. It is noted that, as defined in the present application, when a feature "A" is described as being "proportional" to another feature "B", A increases as B increases and A decreases as B decreases.

Flowchart 300 continues with, for each pixel 463b of unsharp frame 461b, identifying a second confidence value 467 corresponding to each of other pixels 463a to which pixel 463b is mapped by mapping 462, based on mapping 462 and reverse mapping 464 (action 365). Identification of second confidence value 467 may be performed by sample-based video sharpening software code 110/210/410, executed by hardware processor 104/254, and using map confidence analysis module 475.

Analogous to the correspondence function for mapping 462 expressed as Equation 2, above, a correspondence function h(x, t) for reverse mapping 464 is introduced as Equation 4:

$$h(x,t) = (x+v(x,y), y+v(x,y), t)^T$$

Second confidence value 467 corresponds to the correlation of mapping 462 and reverse mapping 464, and makes use of the fact that in non-problematic regions where optical flow maps are correct, the correspondence functions g and h given by respective Equations 2 and 4 are inverse to each other, i.e. h∘g=id with the identity function denoted by id. Thus the amount of deviation from g and h being inverse to each other provides second confidence value 467, i.e., $w_f(x, t)$, which may be expressed using Equation 5 as:

$$w_f(x, t) = \exp\left(\frac{-\|((h \circ g) - id)(x, t)\|^2}{\sigma_f^2}\right)$$

where $\sigma_f$ is the standard deviation of the roughly Gaussian function $w_f(x, t)$.

According to Equation 5, above, confidence value 467 corresponding to each of other pixels 463a is based on a comparison of reverse mapping 464 to mapping 462. Furthermore, confidence value 467 is proportional to the extent to which reverse mapping 464 is inverse to mapping 462.

In some implementations, the method outlined by flowchart 300 can conclude with, for each pixel 463b of unsharp frame 461b, sharpening pixel 463b based on a weighted combination of other pixels 463a to which pixel 463b has been mapped, where the weighted combination is determined using confidence values 465 and confidence values 467 (action 366). For example, an additional mapping $\varphi$: N×N→N may be determined, where $\varphi(t_0, i)$ returns the index of the i-th closest sharp frame 461a in time when considering the temporal distance to the unsharp frame 461b ($t_0$).

In addition, in some implementations, it may be advantageous or desirable to identify an optional third confidence value 468 corresponding to other pixel 463a of each of sharp frames 461a based on the sharpness of those other pixels 463a. For instance, in one implementation, optional third confidence value 468 may take the form of a gradient weight $w_\nabla(x, t)$, where $w_\nabla(x, t)$ is expressed by Equation 6:

$$w_\nabla(x,t) = \|\nabla(G_\sigma * (f \circ g)(x,t))\|^{\lambda}$$

It is noted that the parameter λ in Equation 6 may be used to scale the influence of third confidence value 468 relative to first and second confidence values 465 and 467. In practice, Applicants have determined that λ=1 is often sufficient. Identification of optional third confidence value 468 may be performed by sample-based video sharpening software code 110/210/410, executed by hardware processor 104/254, and using sharpness analysis module 471.

In implementations in which optional third confidence value 468 is utilized, sharpening of pixel 463b in action 366 may be performed based on a weighted combination of other pixels 463a determined using first confidence values 465, second confidence values 467, and third confidence values 468. Sharpening of pixel 463b using either of the weighted combinations described above may be performed by sample-based video sharpening software code 110/210/410, executed by hardware processor 104/254, and using sharpening module 476.

For example, when using all of confidence values 465, 467, and 468, the sharpened result for pixel 463b at location x in unsharp frame 461b ($t_0$) can be expressed as a convex combination by Equation 7:

$$\hat{f}(x, t_0) = \left(\sum_{i=0}^{n-1}(w_c \cdot w_f \cdot w_\nabla \cdot (f \circ g))(x, \varphi(t_0, i))\right) \cdot \left(\sum_{i=0}^{n-1}(w_c \cdot w_f \cdot w_\nabla)(x, \varphi(t_0, i))\right)^{-1}$$

With respect to Equation 7, there is one caveat to consider. Since the overall weighting function $\hat{f}(x, t_0)$ contains optional third confidence value 468 given by Equation 6, which in some instances may be equal to zero, the entire denominator in Equation 7 will evaluate to zero at those points where all correspondences in neighboring frames have a vanishing gradient. In those cases, a sharpened solution at cannot be obtained using Equation 7.

There are several ways to overcome the problem of a vanishing gradient that results in a zero value for optional third confidence value 468. For example, optional third confidence value 468 ($w_\nabla$) may be omitted from Equation 7, in which case sharpening of pixel 463b in action 366 is performed using a weighted combination of other pixels 463a determined using first and second confidence values 465 ($w_c$) and 467 ($w_f$), given by respective Equations 3 and 5, but not using third confidence value 468 ($w_\nabla$), given by Equation 6.

However, in practice, Applicants have discovered that the following remedy works well. The sum of confidence values 465, 467, and 468 can be interpreted as an indicator of the overall confidence that the sharpening described by Equation 7 is stable in a given location and further define c(x, $t_0$) using Equation 8:

$$c(x, t_0) = \left(\max_x \sum_{i=0}^{n-1}(w_c \cdot w_f \cdot w_\nabla)(x, \varphi(t_0, i))\right) \cdot \left(\sum_{i=0}^{n-1}(w_c \cdot w_f \cdot w_\nabla)(x, \varphi(t_0, i))\right)^{\lambda_o}$$

with $\lambda_c=0.25$ as the normalized confidence value. The final sharpened result for pixel 463b is then computed as a blend of the original unsharp image and the sharpened image given by Equation 7, where the original unsharp image is preserved in locations where sharpening is not possible due to vanishing of third confidence value 468. That final sharpened result for pixel 463*b* may be expressed as:

$$c(x,t_0) \cdot \hat{f}(x,t_0) + (1 - c(x,t_0)) \cdot f(x,t_0)$$

Action 366 is performed for each pixel 463*b* of unsharp frame 461*b*, thereby sharpening unsharp frame 461*b*. Moreover, the method described above can be iteratively applied to other unsharp frames of video sequence 160/460 to produce sharpened video 166/466.

Thus, the present application discloses a sample-based video sharpening solution that overcomes the drawbacks and deficiencies in the conventional art by performing sharpening in 2D image-space to determine a mapping of pixels in an unsharp frame of a video sequence to respective other pixels in sharp frames of the video sequence. In addition, a reverse mapping of the other pixels to the pixel in the unsharp frame is determined. Confidence values corresponding respectively to the other pixels and to a correlation of the mapping and reverse mapping are identified and used to sharpen the pixel in the unsharp frame. By performing sharpening in 2D image-space, rather than in 3D scene space, the present solution enables high quality, temporally coherent, sharpening of arbitrary video sequences including dynamic content and little or no camera motion, while advantageously preserving small scale features included in video images.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A video processing system comprising:
    a computing platform including a hardware processor and a system memory;
    a sample-based video sharpening software code stored in the system memory;
    the hardware processor configured to execute the sample-based video sharpening software code to:
        receive a video sequence;
        classify a plurality of frames of the video sequence as sharp frames and at least one frame of the video sequence as an unsharp frame;
        for each pixel of the unsharp frame:
            determine a mapping of the pixel to an other pixel in each of the sharp frames;
            determine a reverse mapping of the other pixel in each of the sharp frames to the pixel in the unsharp frame;
            identify a first confidence value corresponding to the other pixel in each of the sharp frames, based on the mapping;
            identify a second confidence value corresponding to the other pixel in each of the sharp frames, based on the mapping and the reverse mapping; and
            sharpen the pixel as a combination of the pixel and the other pixel in each of the sharp frames, wherein the other pixel in each of the sharp frames is weighted using the first confidence value and the second confidence value.

2. The video processing system of claim 1, wherein for each pixel of the unsharp frame, the hardware processor is further configured to execute the sample-based video sharpening software code to:
    identify a third confidence value corresponding to the other pixel in each of the sharp frames, based on a sharpness of the other pixel; and
    sharpen the pixel as a combination of the pixel and the other pixel in each of the sharp frames, wherein the other pixel in each of the sharp frames is weighted using the first confidence value, the second confidence value, and the third confidence value.

3. The video processing system of claim 1, wherein the pixel has a first location in the unsharp frame, and wherein the other pixel in each of the sharp frames has a respective second location in the sharp frames.

4. The video processing system of claim 1, wherein the first confidence value corresponding to the other pixel in each of the sharp frames is based on a color match between the pixel of the unsharp frame and the other pixel.

5. The video processing system of claim 1, wherein the first confidence value is proportional to a color match between the pixel of the unsharp frame and the other pixel.

6. The video processing system of claim 1, wherein the second confidence value corresponding to the other pixel in each of the sharp frames is based on a comparison of the reverse mapping to the mapping.

7. The video processing system of claim 1, wherein the second confidence value corresponding to the other pixel in each of the sharp frames is proportional to an extent to which the reverse mapping is inverse to the mapping.

8. A method for use by a video processing system including a computing platform having a hardware processor and a system memory storing a sample-based video sharpening software code, the method comprising:
    receiving, using the hardware processor, a video sequence;
    classifying, using the hardware processor, a first plurality of frames of the video sequence as sharp frames and at least one frame of the video sequence as an unsharp frame;
    for each pixel of the unsharp frame:
        determining, using the hardware processor, a mapping of the pixel to an other pixel in each of the sharp frames;
        determining, using the hardware processor, a reverse mapping of the other pixel in each of the sharp frames to the pixel in the unsharp frame;
        identifying, using the hardware processor, a first confidence value corresponding to the other pixel in each of the sharp frames, based on the mapping;
        identifying, using the hardware processor, a second confidence value corresponding to the other pixel in each of the sharp frames, based on the mapping and the reverse mapping; and
        sharpening, using the hardware processor, the pixel as a combination of the pixel and the other pixel in each of the sharp frames, wherein the other pixel in each of the sharp frames is weighted using the first confidence value and the second confidence value.

9. The method of claim 8, further comprising, for each pixel of the unsharp frame:

identifying, using the hardware processor, a third confidence value corresponding to the other pixel in each of the sharp frames, based on a sharpness of the other pixel; and sharpening, using the hardware processor, the pixel as a combination of the pixel and the other pixel in each of the sharp frames, wherein the other pixel in each of the sharp frames is weighted using the first confidence value, the second confidence value, and the third confidence value.

10. The method of claim 8, wherein the pixel has a first location in the unsharp frame, and wherein the other pixel in each of the sharp frames has a respective second location in the sharp frames.

11. The method of claim 8, wherein the first confidence value corresponding to the other pixel in each of the sharp frames is based on a color match between the pixel of the unsharp frame and the other pixel.

12. The method of claim 8, wherein the first confidence value is proportional to a color match between the pixel of the unsharp frame and the other pixel.

13. The method of claim 8, wherein the second confidence value corresponding to the other pixel in each of the sharp frames is based on a comparison of the reverse mapping to the mapping.

14. The method of claim 8, wherein the second confidence value corresponding to the other pixel in each of the sharp frames is proportional to an extent to which the reverse mapping is inverse to the mapping.

15. A computer-readable non-transitory medium having stored thereon instructions, which when executed by a hardware processor, instantiate a method comprising:
receiving a video sequence;
classifying a plurality of frames of the video sequence as sharp frames and at least one frame of the video sequence as an unsharp frame;
for each pixel of the unsharp frame:
determining a mapping of the pixel to an other pixel in each of the sharp frames;
determining a reverse mapping of the other pixel in each of the sharp frames to the pixel in the unsharp frame;
identifying a first confidence value corresponding to the other pixel in each of the sharp frames, based on the mapping;
identifying a second confidence value corresponding to the other pixel in each of the sharp frames, based on the mapping and the reverse mapping; and
sharpening the pixel as a combination of the pixel and the other pixel in each of the sharp frames, wherein the other pixel in each of the sharp frames is weighted using the first confidence value and the second confidence value.

16. The computer-readable non-transitory medium of claim 15, wherein the method further comprises, for each pixel of the unsharp frame:
identifying a third confidence value corresponding to the other pixel in each of the sharp frames, based on a sharpness of the other pixel; and
sharpening the pixel as a combination of the pixel and the other pixel in each of the sharp frames, wherein the other pixel in each of the sharp frames is weighted using the first confidence value, the second confidence value, and the third confidence value.

17. The computer-readable non-transitory medium of claim 15, wherein the pixel has a first location in the unsharp frame, and wherein the other pixel in each of the sharp frames has a respective second location in the sharp frames.

18. The computer-readable non-transitory medium of claim 15, wherein the first confidence value corresponding to the other pixel in each of the sharp frames is based on a color match between the pixel of the unsharp frame and the other pixel.

19. The computer-readable non-transitory medium of claim 15, wherein the first confidence value is proportional to a color match between the pixel of the unsharp frame and the other pixel.

20. The computer-readable non-transitory medium of claim 15, wherein the second confidence value corresponding to the other pixel in each of the sharp frames is based on a comparison of the reverse mapping to the mapping.

* * * * *